United States Patent
Lee et al.

(10) Patent No.: US 11,863,330 B2
(45) Date of Patent: Jan. 2, 2024

(54) METHOD FOR HARQ FEEDBACK IN WIRELESS COMMUNICATION SYSTEM AND APPARATUS THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1276 days.

(21) Appl. No.: 16/346,979

(22) PCT Filed: Nov. 3, 2017

(86) PCT No.: PCT/KR2017/012406
§ 371 (c)(1),
(2) Date: May 2, 2019

(87) PCT Pub. No.: WO2018/084634
PCT Pub. Date: May 11, 2018

(65) Prior Publication Data
US 2023/0155748 A1 May 18, 2023

Related U.S. Application Data

(60) Provisional application No. 62/417,321, filed on Nov. 4, 2016.

(51) Int. Cl.
*H04L 1/20* (2006.01)
*H04L 5/00* (2006.01)
(Continued)

(52) U.S. Cl.
CPC ............. *H04L 1/1887* (2013.01); *H04L 1/20* (2013.01); *H04L 5/0055* (2013.01); *H04L 1/0003* (2013.01); *H04L 1/1812* (2013.01)

(58) Field of Classification Search
CPC ... H04W 28/04; H04W 72/04; H04W 72/042; H04W 88/08; H04W 72/11;
(Continued)

(56) References Cited

U.S. PATENT DOCUMENTS

| | | | |
|---|---|---|---|
| 8,429,481 B2 * | 4/2013 | Lohr | H04L 1/1819 714/751 |
| 10,717,448 B1 * | 7/2020 | Seo | G05D 1/0022 |

(Continued)

OTHER PUBLICATIONS

3GPP TSG RAN WG1 Meeting #86bis, Lisbon, Portugal, Oct. 10-14, 2016, R1-1608845, Agenda Item: 8.1.8, Source: Huawei, HiSilicon, Title: Support of URLLC in UL. (Year: 2016).*
(Continued)

*Primary Examiner* — Peter G Solinsky
*Assistant Examiner* — Sanjay K Dewan
(74) *Attorney, Agent, or Firm* — BRYAN CAVE LEIGHTON PAISNER LLP

(57) ABSTRACT

A method for performing fast retransmission in a wireless communication system, according to one embodiment of the present disclosure, is performed by a terminal, and comprises the steps of: receiving downlink data or transmitting uplink data; and performing a hybrid automatic repeat request (HARQ) operation including retransmission, in which transmission and reception of a HARQ-acknowledgement (HARQ-ACK) for the downlink data or the uplink data are not present or retransmission scheduling is not present, for the downlink data and the uplink data.

17 Claims, 6 Drawing Sheets

(51) Int. Cl.
  *H04L 1/1867* (2023.01)
  *H04L 1/00* (2006.01)
  *H04L 1/1812* (2023.01)

(58) Field of Classification Search
  CPC ... H04W 72/115; H04W 72/40; H04W 72/23; H04L 5/0007; H04L 1/1887; H04L 1/20; H04L 5/0055; H04L 1/1812
  USPC .......................................................... 370/329
  See application file for complete search history.

(56) References Cited

U.S. PATENT DOCUMENTS

| | | | | |
|---|---|---|---|---|
| 10,783,587 | B1* | 9/2020 | Augustine | G06Q 40/08 |
| 2010/0085927 | A1* | 4/2010 | Torsner | H04L 1/1896 370/329 |
| 2012/0147836 | A1 | 6/2012 | Ishii et al. | |
| 2012/0300665 | A1* | 11/2012 | Wang | H04W 52/221 370/252 |
| 2014/0301302 | A1* | 10/2014 | Xu | H04L 1/1854 370/329 |
| 2015/0029890 | A1* | 1/2015 | Siomina | H04L 12/1877 370/312 |
| 2016/0100422 | A1* | 4/2016 | Papasakellariou | H04L 1/1822 370/329 |
| 2016/0135143 | A1* | 5/2016 | Won | H04W 52/367 370/312 |
| 2019/0036652 | A1* | 1/2019 | Baghel | H04L 1/1896 |
| 2019/0364424 | A1* | 11/2019 | Vanderveen | H04L 61/5053 |
| 2020/0221310 | A1* | 7/2020 | Babaei | H04W 72/0466 |
| 2020/0221485 | A1* | 7/2020 | Cirik | H04L 25/0226 |
| 2020/0260486 | A1* | 8/2020 | Zhou | H04L 1/1893 |
| 2021/0028843 | A1* | 1/2021 | Zhou | H04B 7/063 |

OTHER PUBLICATIONS

3GPP TSG RAN WG1 Meeting #86bis, Lisbon, Potugal, Oct. 10-14, 2016, R1-1608859, Lisbon, Portugal, Oct. 10-14, 2016, R1-1608859, Agenda Item: 8.1.1.2, Source: Huawei, HiSilicon, Title: The retransmission and HARQ schemes for grant-free. (Year: 2016).*

3GPP TSG RAN WG1 #86bis, Lisbon, Portugal, Oct. 10-14, 2016, R1-1609056, Agenda item: 8.1.6.1, Source: Samsung, Title: Multiplexing UL URLLC and eMBB. (Year: 2016).*

Huawei, HiSilicon, "Support of URLLC in UL", 3GPP TSG RAN WG1 Meeting #86bis, Oct. 10-14, 2016, R1-1608845.

Huawei, HiSilicon, "The retransmission and HARQ schemes for grant-free", 3GPP TSG RAN WG1 Meeting #86bis, Oct. 10-14, 2016, R1-1608859.

Samsung, "Multiplexing UL URLLC and eMBB", 3GPP TSG RAN WG1 #86bis, Oct. 10-14, 2016, R1-1609056.

* cited by examiner

METHOD FOR HARQ FEEDBACK IN WIRELESS COMMUNICATION SYSTEM AND APPARATUS THEREFOR

TECHNICAL FIELD

The present disclosure relates to a wireless communication system and, more particularly, to a method for HARQ feedback to reduce latency and an apparatus therefor.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure is intended to deal with uplink transmission such as transmission of a hybrid automatic repeat request (HARQ) feedback or uplink data in a wireless communication system supporting latency reduction.

DESCRIPTION OF THE INVENTION

Technical Problems

The present disclosure relates to a HARQ behavior for reducing latency, i.e., an operation of a UE for retransmission or an operation of a network/eNB.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an embodiment of the present disclosure, provided herein is a method of performing fast retransmission in a wireless communication system. The method is performed by a user equipment (UE) and includes receiving downlink (DL) data or transmitting uplink (UL) data; and performing a hybrid automatic repeat request (HARQ) behavior including retransmission for the DL data or the UL data without transmission and reception of HARQ-acknowledgement (ACK) or without retransmission scheduling, wherein the HARQ behavior is configured as one of the following methods in which whether to perform the retransmission is configured per traffic usage or service type of the DL data or the UL data, whether to perform the retransmission is configured per time or frequency resource set in which the DL data or the UL data is transmitted, whether to perform the retransmission is configured per DL control information format for scheduling the DL data or the UL data and/or search space of a DL control channel, whether to perform the retransmission is configured per modulation and coding scheme (MCS) and/or quality of service (Qos) class set of the DL data or the UL data, and whether to perform the retransmission is configured according to a target block error rate (BLER) of the DL data or the UL data.

Additionally or alternatively, a channel state information reference resource for the HARQ behavior may be different from a channel state information reference resource for a regular HARQ behavior with HARQ-ACK transmission or retransmission scheduling.

Additionally or alternatively, the retransmission may be performed after a predetermined time from DL data transmission prior to the retransmission.

Additionally or alternatively, the retransmission may be performed in a first transmission time interval (TTI) which is available after DL data transmission prior to the retransmission.

Additionally or alternatively, if transmission time interval (TTI) length used for the retransmission is different from TTL length used for a regular HARQ behavior with HARQ-ACK transmission or retransmission scheduling, an MCS for the retransmission may be configured based on the TTI length according to the regular HARQ behavior.

Additionally or alternatively, a maximum number of retransmissions for the retransmission may be individually configured per traffic usage or service type of the DL data, per time or frequency resource set in which the DL data is transmitted, per DL control information format for scheduling the DL data and/or search space of a DL control channel, or per MCS and/or QoS class set of the DL data.

Additionally or alternatively, an MCS for the retransmission may be determined as a value to which an offset which is predetermined from an MCS used for initial transmission or transmission prior to the retransmission is applied.

Additionally or alternatively, the MCS for the retransmission may be used only for retransmission for initial transmission or for retransmission belonging to a range of a predetermined number of times.

Additionally or alternatively, transmission power for the retransmission may be determined as a value to which an offset which is predetermined from transmission power used for initial transmission or transmission prior to the retransmission is applied.

Additionally or alternatively, the transmission power for the retransmission may be used only for retransmission for initial transmission or retransmission belonging to a range of a predetermined number of times.

Additionally or alternatively, resource assignment for the retransmission may be performed on a frequency resource separated from a resource assigned for transmission prior to the retransmission by a predetermined offset.

Additionally or alternatively, resource assignment for the retransmission may include frequency hopping according to one of plural predetermined patterns.

Additionally or alternatively, a redundancy version (RV) for the retransmission may be cyclically shifted according to a predetermined pattern.

Additionally or alternatively, the HARQ behavior may be used only for retransmission for initial transmission or for retransmission belonging to a range of a predetermined number of times.

According to another embodiment of the present disclosure, provided herein is a user equipment (UE) for performing fast retransmission in a wireless communication system, including: a receiver and a transmitter; and a processor configured to control the receiver and the transmitter, wherein the processor: receives downlink (DL) data or transmits uplink (UL) data, and performs a hybrid automatic repeat request (HARQ) behavior including retransmission for the DL data or the UL data without HARQ-acknowledgement (ACK) transmission and reception or without retransmission scheduling, wherein the HARQ behavior is configured as one of the following methods in which whether to perform the retransmission is configured per traffic usage or service type of the DL data or the UL data, whether to perform the retransmission is configured per time or frequency resource set in which the DL data or the UL data is transmitted, whether to perform retransmission is configured per DL control information format for scheduling the DL data or the UL data and/or search space of a DL control channel, whether to perform the retransmission is configured per modulation and coding scheme (MCS) and/or quality of service (Qos) class set of the DL data or the UL data, and whether to perform the retransmission is configured according to a target block error rate (BLER) of the DL data or the UL data.

The aforementioned solutions are just a part of embodiments of the present disclosure. Various embodiments to which technical characteristics of the present disclosure are reflected can be drawn and understood based on detail explanation on the present disclosure to be described in the following by those skilled in the corresponding technical field.

Advantageous Effects

According to embodiments of the present disclosure, HARQ transmission satisfying low latency can be performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

MODE FOR CARRYING OUT THE INVENTION

Figure 1:
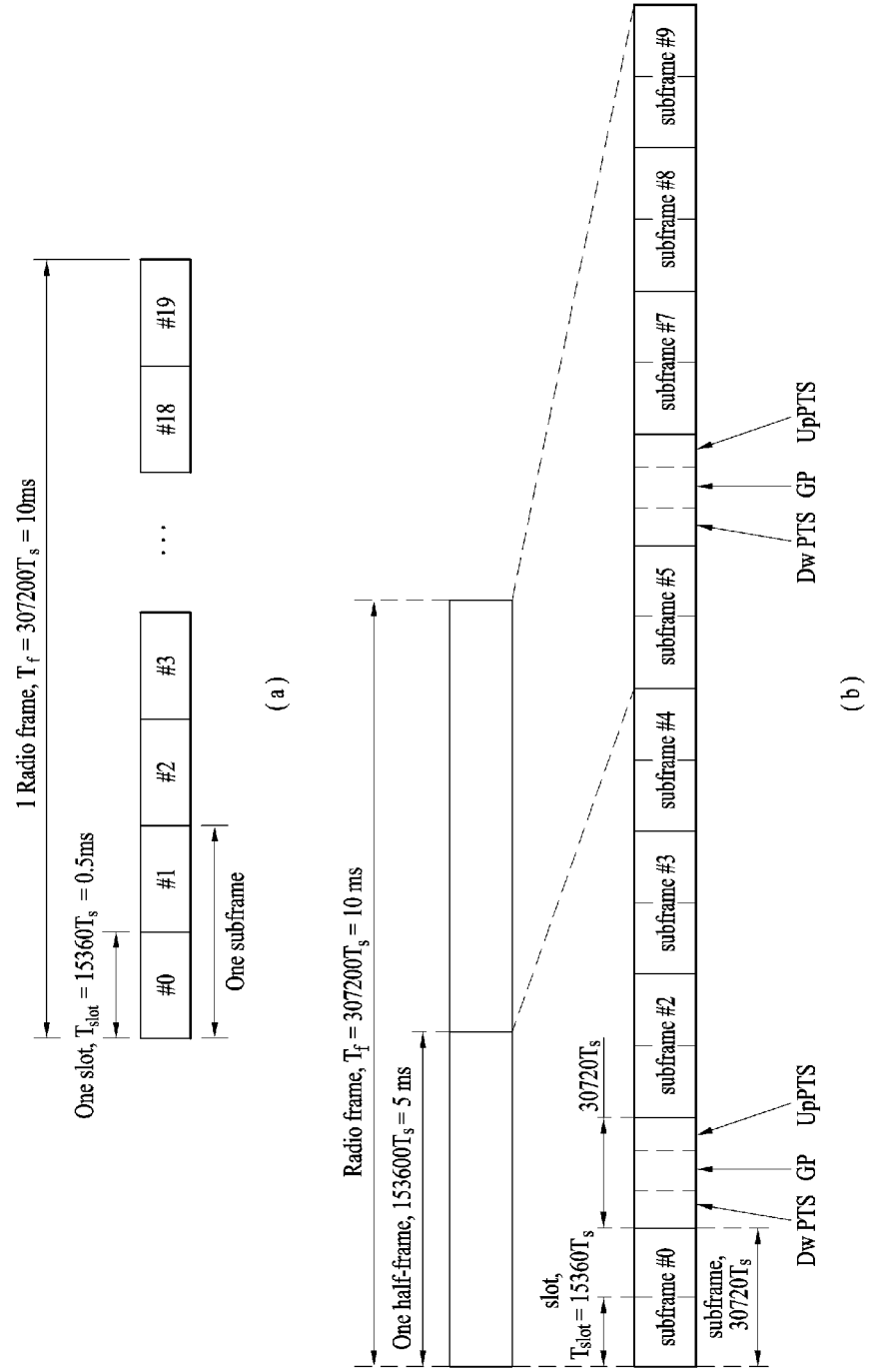
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · Ts    |              |              |
| 8 | 24144 · $T_s$ |              |              | —             | —            | —            |
| 9 | 13168 · $T_s$ |              |              | —             | —            | —            |

Figure 2:
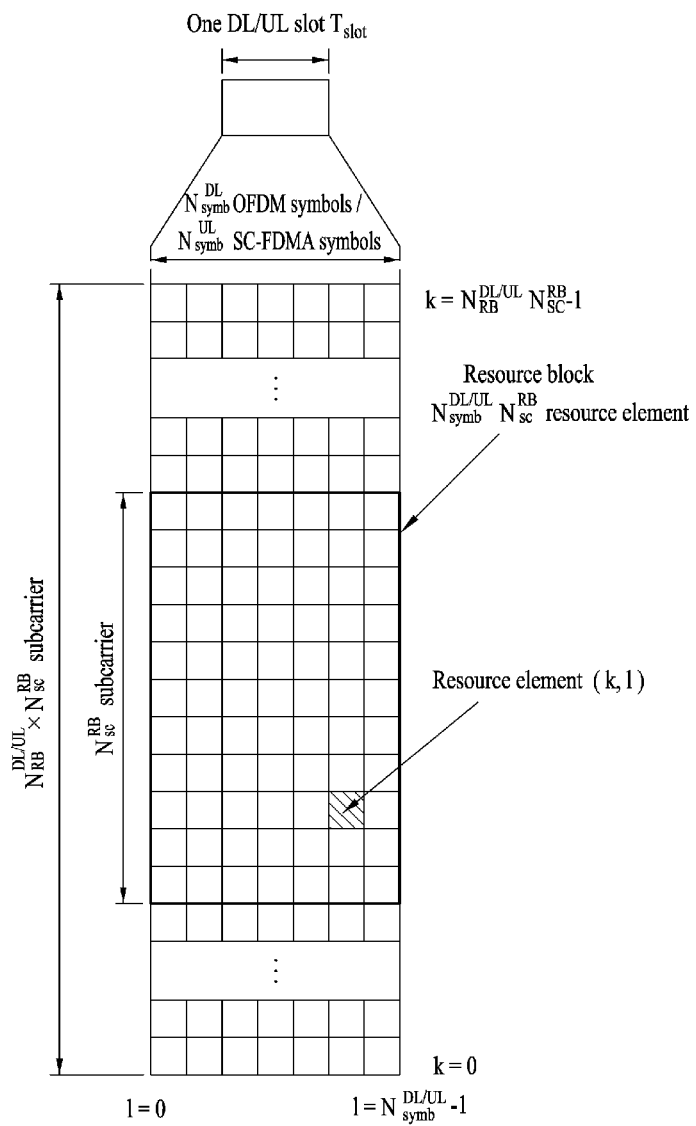
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
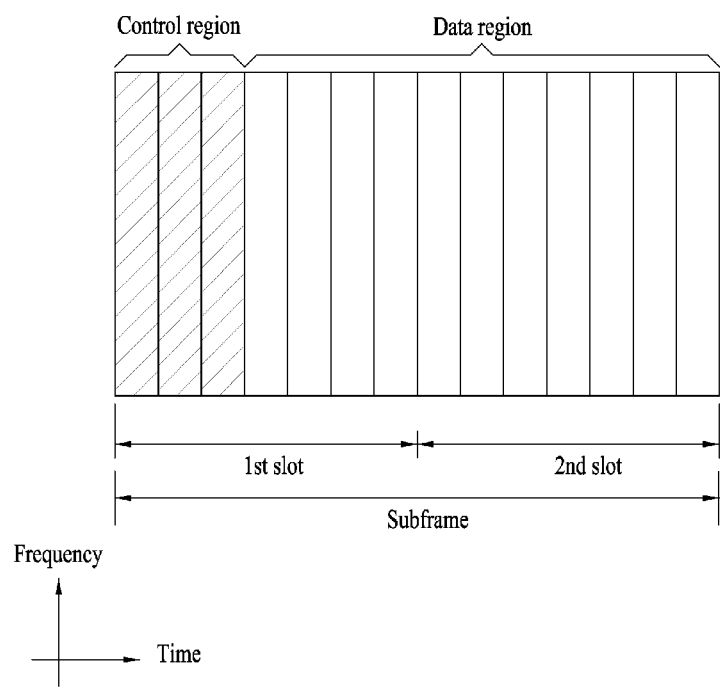
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number |
|---|---|---|---|
| Type | Aggregation Level L | Size [in CCEs] | of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)- masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
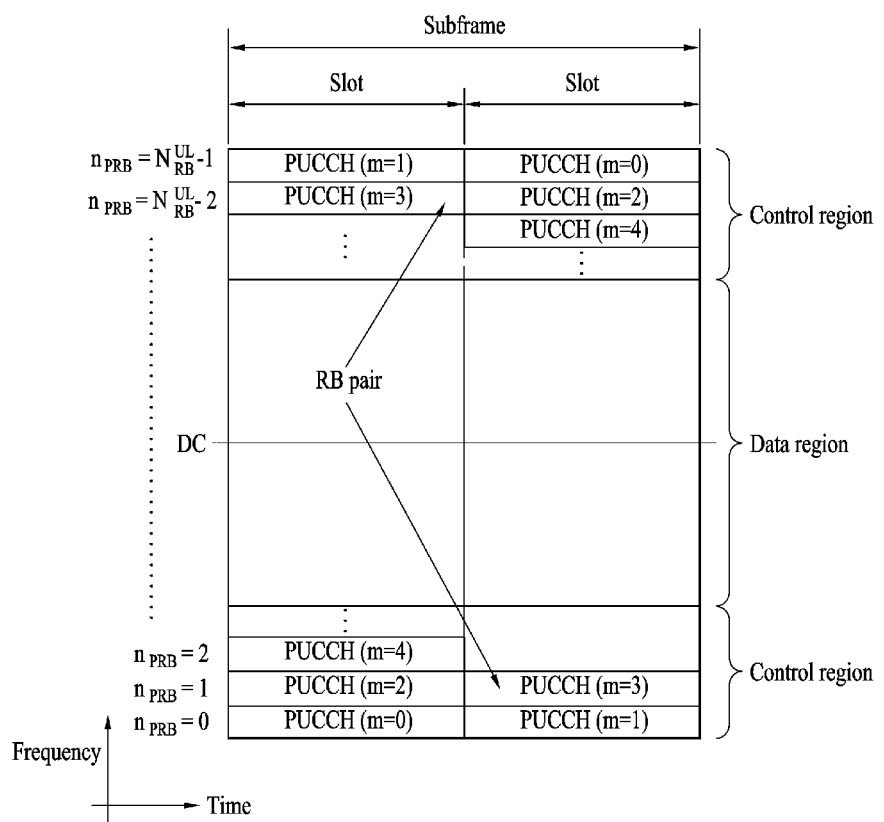
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:
  i) a demodulation reference signal (DMRS) for channel estimation for coherent demodulation of information transmitted through a PUSCH and a PUCCH; and
  ii) a sounding reference signal (SRS) used for an eNB to measure uplink channel quality at a frequency of a different network.

The downlink reference signal includes:
  i) a cell-specific reference signal (CRS) shared by all UEs in a cell;
  ii) a UE-specific reference signal for a specific UE only;
  iii) a DMRS transmitted for coherent demodulation when a PDSCH is transmitted;
  iv) a channel state information reference signal (CSI-RS) for delivering channel state information (CSI) when a downlink DMRS is transmitted;
  v) a multimedia broadcast single frequency network (MBSFN) reference signal transmitted for coherent demodulation of a signal transmitted in MBSFN mode; and
  vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Basic Description of HARQ Operation

In an LTE FDD system, 8 stop-and-wait (SAW) HARQ processes are supported in a constant round-trip time (RTT) of 8 ms on both UL and DL.

Each HARQ process is defined by a unique HARQ process identifier (or number) of a 3-bit size (a 4-bit size in the case of LTE TDD). A reception end (i.e., a UE in a DL HARQ process and an eNodeB in a UL HARQ process) requires individual soft buffer allocation for the combination of retransmitted data. Further, in the LTE system, for a HARQ operation, information such as a new data indicator (NDI), a redundancy version (RV), and a modulation and coding scheme (MCS) level is defined as being signaled to the reception end.

A DL HARQ process of the LTE system is an adaptive asynchronous scheme. Therefore, DCI for a HARQ process is explicitly accompanied in every DL transmission. On the other hand, a UL HARQ process of the LTE system is a synchronous scheme and may support both adaptive and non-adaptive schemes. The UL non-adaptive HARQ scheme requires a preset RV sequence, i.e., a sequence such as 0, 2, 3, 1, 0, 2, 3, 1, . . . , for consecutive packet transmission because the UL non-adaptive HARQ scheme does not accompany explicit signaling of control information. However, in the UL adaptive HARQ scheme, an RV is explicitly signaled.

In the FDD system, a UE may transmit HARQ ACK/NACK information in subframe index n for PDSCH transmission received in subframe index (n-k) (e.g., k=4 in the LTE system). The UE may determine a PUCCH resource index in which the UE is to transmit HARQ ACK/NACK in subframe n from a PDCCH indicating PDSCH transmission in subframe (n-k).

For example, the PUCCH resource index in the LTE system is determined as follows.

$$n^{(1)}_{PUCCH} = n_{CCE} + N^{(1)}_{PUCCH} \quad \text{[Equation 1]}$$

Herein, $n^{(1)}_{PUCCH}$ represents a resource index of PUCCH format 1 for ACK/NACK transmission, $N^{(1)}_{PUCCH}$ represents a signaling value received from a higher layer, and $n_{CCE}$ is the smallest value of CCE indexes used for PDCCH transmission. A cyclic shift, an orthogonal spread code, and a PRB for PUCCH format 1a/1b are acquired from $n^{(1)}_{PUCCH}$.

Each PUCCH resource index corresponds to a PUCCH resource for ACK/NACK. For example, if a PDCCH including CCEs 4, 5, and 6 delivers scheduling information for a PDSCH to a UE and CCE 4 is linked to PUCCH resource index 4, the UE transmits ACK/NACK to a BS on PUCCH resource 4 corresponding to CCE 4 constituting the PDCCH.

Next, ACK/NACK transmission in a TDD mode will be described.

In the TDD mode, since DL transmission and UL transmission are distinguished from each other by time, subframes within one radio frame are divided into DL subframes and UL subframes. For detailed UL-DL configurations in the TDD mode, reference is made to Table 1.

In a TDD system, a UE may transmit, in one UL subframe, ACK/NACK information for PDSCH transmission in one or more DL subframes. The UE may transmit HACK ACK/NACK information in UL subframe n for PDSCH transmission received in DL subframe n-k and k may be given according to the UL-DL configurations. For example, for UL-DL configurations of Table 3, a set of DL related indexes K $\{k_0, k_1, \ldots k_{M-1}\}$ may be given as shown in Table 4.

TABLE 5

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6,5 | 5,4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the case of UL-DL configuration 0 given in the above table, k is 4 in UL subframe 9. Thus, ACK/

NACK information for data received in DL subframe 5 (=9-4) may be transmitted in UL subframe 9.

As more communication devices have demanded higher communication capacity, there has been necessity of enhanced mobile broadband (eMBB) communication relative to legacy radio access technology. In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation radio access technology has been discussed by taking into consideration eMBB communication, massive MTC (mMTC), ultra-reliable and low-latency communication (URLLC), and the like. In the present disclosure, the above technology is referred to as new radio access technology (new RAT) for convenience of description.

Hereinafter, a proposed method will be described focusing on a new RAT system for convenience of description. However, the range of a system to which the proposed method is applied may be extended to other systems such as a 3GPP LTE/LTE-A system, in addition to the new RAT system.

Fast Retransmission

Configurability of HARQ-ACK Behaviors

A URLLC UE may demand a fast HARQ-ACK procedure in order to satisfy stricter latency requirements. To achieve these requirements, PRACH/SR transmission and/or short TTI (sTTI) based HARQ-ACK processing may be considered by adjusting numerology such as TTI length. However, for a UE located relatively close to a cell edge, sTTI transmission may not be desirable in terms of reliability securement. To reduce latency of such a UE, a method of permitting retransmission without HARQ-ACK and/or retransmission scheduling or previously performing repetition (transmission) by increasing resources or a TTI to low a code rate may be considered. Such an operation mode is referred to as a fast retransmission mode in this disclosure. Characteristically, a regular HARQ-ACK based retransmission mode and a fast retransmission mode are configurable and a rule may be defined such that a retransmission operation of the UE conforms to a corresponding configuration. Detailed examples of the configuration are described below.

Proposal 1: The HARQ-ACK behavior of the UE may be determined through a higher layer or physical layer signal.

Proposal 2: The HARQ-ACK behavior of the UE may be determined per service type. Herein, the service type may represent traffic usage such as eMBB/URLLC/mMTC. As an example, for eMBB, the regular HARQ-ACK based retransmission mode may be applied and, for URLLC, the fast retransmission mode without HARQ-ACK may be applied.

Proposal 3: The HARQ-ACK behavior of the UE may be determined per preconfigured time/frequency resource (set). As an example, the HARQ-ACK behavior may be determined for a specific resource and the UE may assume that the HARQ-ACK behavior of a corresponding specific mode is applied to data scheduled for the resource.

Proposal 4: The HARQ-ACK behavior of the UE may be determined per DCI format(s) and/or search space of a control channel. For example, when scheduling is performed by a control channel of a specific DCI format, the regular HARQ-ACK based retransmission mode may be applied and, for the other DCI formats, the fast retransmission mode without HARQ-ACK may be applied.

Proposal 5: The HARQ-ACK behavior of the UE may be determined per MCS and/or quality of service (QoS) class (set). That is, the regular HARQ-ACK based retransmission mode or the fast retransmission mode without HARQ-ACK may be applied per MCS and/or QoS class (set).

Proposal 6: A plurality of target block error rates (BLERs) may be defined and a rule may be defined such that a different HARQ-ACK behavior is applied to each BLER. As an example, a rule may be defined such that, if a target BLER for specific traffic is defined as $10^{-3}$, the UE may operate in the regular HARQ-ACK mode and, if the target BLER is defined as $10^{-5}$, the UE may operate in the fast retransmission mode.

A rule may be defined such that configurability of the HARQ-ACK mode is applied to initial transmission and/or retransmission.

CSI Feedback

For one data transmission, target BLERs based on the regular HARQ-ACK mode and the fast retransmission mode may be different with respect to the same use case. For example, if a data BLER target according to a regular HARQ-ACK procedure is $10^{-3}$, a data BLER when fast retransmission is performed twice may be $10^{-6}$. Therefore, a target BLER according to the number of retransmissions/repetitions defined for the fast retransmission mode may be different from a target BLER in the regular HARQ-ACK mode. In this situation, an MCS which is derived according to channel estimation performance of the UE may differ. As an example, MCSs to be derived may differ when a CSI reference resource is one slot and the target BLER is $10^{-5}$ and when the CSI reference resource is one mini-slot and the target BLER is $10^{-3}$. Accordingly, a rule may be defined such that the CSI reference resource and/or the target BLER is differently configured according to a HARQ-ACK mode. Alternatively, a rule may be defined such that CSI reference resources and/or the target BLERs of initial transmission and retransmission are differently configured. Alternatively, a rule may be defined such that the CSI reference resource and/or the target BLER is differently configured per numerology (or TTL length). Thus, this means that separate CSI feedback may be reported.

More generally, a numerology and a HARQ scheme (i.e., indicating which HARQ-ACK mode is to be used) may be included in configuration of a reference resource which is to be used during CSI calculation. That is, the configuration of the reference resource which is to be used during CSI calculation may be differently configured according to the numerology and the HARQ-ACK mode.

Details on Retransmission without HARQ-ACK

In performing retransmission without a HARQ-ACK response for initial transmission or specific transmission, an operation of performing retransmission without scheduling from a network may be defined. Alternatively, in performing the retransmission operation without the HARQ-ACK response for initial transmission or specific transmission, an operation of previously performing scheduling even for retransmission through multi-TTI scheduling may be defined.

When retransmission is performed without DL assignment or UL grant of the network, a rule may be defined such that the retransmission operation is performed after a time which is predefined from previous transmission or configured through a higher layer or physical layer signal. Alternatively, a rule may be defined such that the retransmission operation is performed in the first TTI which is available after previous transmission (e.g., the same transmission direction as previous transmission).

Alternatively, TTI length used for a regular HARQ-ACK behavior may differ from TTI length used for a fast retransmission mode behavior. As an example, the regular HARQ-ACK behavior may be based on a mini-slot or a sub-slot and the fast retransmission behavior may be based on a slot. In this case, an MCS may be configured still based on the mini-slot or sub-slot. When the mini-slot or the sub-slot is mapped to the slot, a scheme of applying rate matching (an RV may be changed) or a repetition format may be used (k*mini-slot or sub-slot where k=slot size/mini-slot size).

More generally, the regular HARQ-ACK mode and the fast retransmission mode may be interpreted as different configurations of TTIs in which data is scheduled. The difference compared to a normal TTI length is that a code rate according to transmission of an sTTI is applied during transmission of a long TTI, a resource for transmission of the long TTI is configured within the sTTI, the resource is repeatedly configured in the time domain. The above scheme may cause an effect of consecutively performing retransmission multiple times. During configuration of the fast retransmission mode, the UE may assume that an sTTI length, which is a reference to calculate the size of a slot, the number of retransmissions, and an MCS, has been configured.

If retransmission is performed without DL assignment or UL grant of the network, the maximum number of retransmissions may be predefined/agreed upon or may be configured through a higher layer or physical layer signal. Characteristically, the maximum number of retransmissions may be differently configured per (1) service type, (2) preconfigured time/frequency resource (set), (3) DCI format(s) and/or search space for a control channel, (4) MCS and/or QoS class (set), or (5) target BLER.

If retransmission is performed without DL assignment or UL grant of the network, a rule may be defined such that a predefined MCS or an MCS configured through the higher layer signal is used for retransmission. Alternatively, a rule may be defined such that an MCS to which an offset predefined from initial transmission or previous transmission or an offset configured through the higher layer signal is applied is used for retransmission. During a fast retransmission operation, adjustment of the MCS may always be applied or may be applied only to retransmission for initial transmission. Alternatively, adjustment of the MCS may be applied only to a predefined or signaled specific number of transmissions.

If retransmission is performed without DL assignment or UL grant of the network, a rule may be defined such that UL transmission power which is predefined or UL transmission power which is configured through the higher layer signal is used for retransmission. Alternatively, a rule may be defined such that UL transmission power to which an offset predefined from initial transmission or previous transmission or an offset configured through the higher layer signal is applied is used for retransmission. During the fast retransmission operation, power control described above may always be applied or may be applied only to retransmission for initial transmission. Alternatively, power control described above may be applied only to a predefined or signaled specific number of retransmissions.

If retransmission is performed without DL assignment or UL grant of the network, a rule may be simply defined to maintain the same resource assignment as previous transmission. Alternatively, a rule may be defined such that resource hopping is applied to retransmission according to a predefined/agreed-upon pattern. As an example, in order to further obtain frequency diversity, retransmission may be performed on a frequency resource mirrored based on a center frequency. Alternatively, a rule may be defined such that one of a plurality of predefined/agreed-upon patterns is configured through a higher layer signal or is indicated through a physical layer signal during scheduling for previous transmission. Alternatively, a rule may be defined such that retransmission is performed on a frequency resource separated from a resource assigned for previous transmission by an offset which is predefined/agreed upon, configured through the higher layer signal, or indicated through the physical layer signal during scheduling of previous transmission. Resource hopping may always be applied during the fast retransmission operation or may be applied only to retransmission for initial transmission. Alternatively, resource hopping may be applied only to a predefined or signaled specific number of retransmissions.

If retransmission is performed without DL assignment or UL grant of the network, a rule may be defined such that an RV is automatically cyclic-shifted during retransmission according to a predefined/agreed-upon pattern. As an example, if the RV is previously defined to be used in order of $\{0,2,3,1\}$, RVs corresponding to respective retransmissions while retransmission is performed three times may be 2, 3, and 1.

For information about retransmission, a parity part may be transmitted. A parity used for retransmission may be desirably configured not to overlap with a parity used for initial transmission. Again, the parity may be selected based on a direction in which spectral efficiency is increased (e.g., a low density parity check (LDPC) may be selected (1) randomly, (2) in correspondence to a parity having a large variable node, (3) in correspondence to a parity having a small variable node, or (4) in order of short iteration through which a parity bit punctured by a belief propagation (BP) algorithm based decoder is updated by reception of information from another node). Alternatively, in the fast retransmission mode, parities starting from a transmission-stopped parity may be used during retransmission.

As another example, when an LDPC encoding result is {info, parity1, parity2, parity3} and an information bit is punctured, then {punctured_info, info, parity1, parity2, parity3} may be obtained. The following example of configuring an RV order may be considered when it is assumed that the information bit is always transmitted.

parity1→parity2→parity3→parity1→parity2→parity3→ (punctured_info is not retransmitted)

parity1→parity2→parity3→punctured_info→ parity1→parity2→parity3→ . . . .

While the above rules have been described under the assumption that retransmission is performed without scheduling from the network, the present disclosure is applicable even to the case in which the fast retransmission operation is performed through multi-TTI scheduling.

Since examples of the above-described proposed methods may also be included in one of implementation methods of the present disclosure, it is obvious that the examples are regarded as a sort of proposed methods. Although the above-described proposed methods may be independently implemented, the proposed methods may be implemented in a combined (aggregated) form of a part of the proposed methods. A rule may be defined such that the eNB informs the UE of information as to whether the proposed methods are applied (or information about rules of the proposed methods) through a predefined signal (e.g., a physical layer signal or a higher-layer signal).

Figure 5:
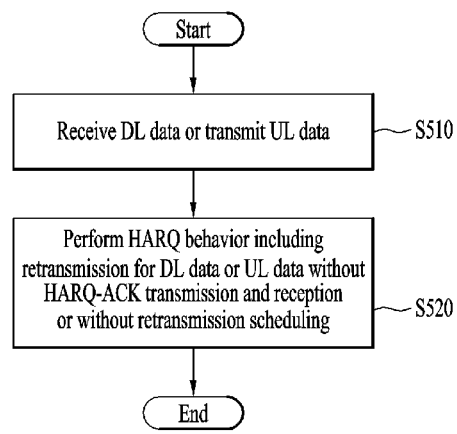
FIG. 5 illustrates an operation of a user equipment (UE) according to an embodiment of the present disclosure.

FIG. 5 illustrates an operation according to an embodiment of the present disclosure.

In FIG. 5, a method of performing fast retransmission in a wireless communication system is illustrated. The method may be performed by a UE. The UE may receive DL data or transmit UL data (S510). Then, the UE may perform a HARQ behavior including retransmission for DL data or UL data without HARQ transmission and reception or without retransmission scheduling (S520). In this case, the HARQ behavior may be configured as one of the following methods: whether to perform retransmission may be configured per traffic usage or service type of the DL data or the UL data, whether to perform retransmission may be configured per time or frequency resource set in which the DL data or the UL data is transmitted, whether to perform retransmission may be configured per DCI format for scheduling the DL data or the UL data and/or per search space of a DL control channel, whether to perform retransmission may be configured per MCS and/or QoS class set of the DL data or the UL data, or whether to perform retransmission may be configured according to target BLER of the DL data or the UL data.

A CSI reference resource for the HARQ behavior may be different from a CSI reference resource for a regular HARQ behavior with HARQ-ACK transmission or retransmission scheduling.

Retransmission according to the HARQ behavior may be performed after a predetermined time from DL data transmission prior to retransmission. Alternatively, retransmission according to the HARQ behavior may be performed in the first TTI which is available after DL data transmission prior to retransmission.

If TTI length used for retransmission is different from TTI length used for the regular HARQ behavior with HARQ-ACK transmission or retransmission scheduling, an MCS for retransmission may be configured based on a TTI according to the regular HARQ behavior. The MCS for retransmission may be determined as a value to which an offset which is predetermined from an MCS used for initial transmission or transmission prior to retransmission is applied. The MCS for retransmission may be used only for retransmission for initial transmission or retransmission belonging to a range of a predetermined number of times.

The maximum number of retransmissions may be individually configured per traffic usage or service type of the DL data, per time or frequency resource set in which the DL data is transmitted, per DCI format for scheduling the DL data and/or search space of a DL control channel, or per MCS and/or QoS class set of the DL data.

Transmission power for retransmission may be determined as a value to which an offset which is predetermined from transmission power used for initial transmission or transmission prior to retransmission is applied. The transmission power for retransmission may be used only for retransmission for initial transmission or retransmission belonging to a range of a predetermined number of times.

Resource assignment for retransmission may be performed on a frequency resource separated from a resource assigned for transmission prior to retransmission by a predetermined offset. Resource assignment for retransmission may include frequency hopping according to one of plural predetermined patterns.

An RV for retransmission may be cyclically shifted according to a predetermined pattern.

The HARQ behavior may be used only for retransmission for initial transmission or retransmission belonging to a range of a predetermined number of times.

Figure 6:
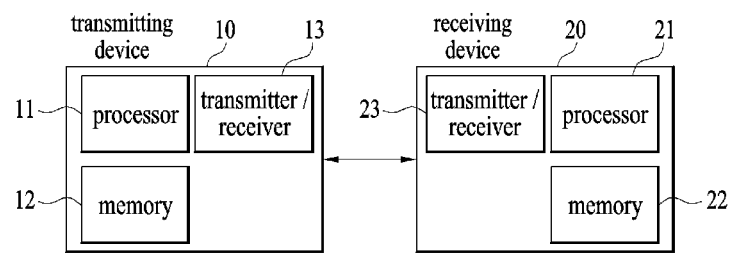
FIG. 6 is a block diagram for a device configured to implement embodiment(s) of the present disclosure.

FIG. 6 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay and an eNB.

The invention claimed is:

1. A method of receiving downlink (DL) data by a user equipment (UE), the method comprising:
    receiving first Downlink Control Information (DCI) for scheduling the DL data;
    receiving the DL data based on the first DCI;
    based on the first DCI being received through a first search space;
    transmitting a hybrid automatic repeat request-acknowledgement (HARQ-ACK) information in response to the DL data;
    receiving second DC for scheduling retransmission of the DL data; and
    receiving retransmitted DL data based on the second DCI, based on the first DCI being received through a second search space different from the second search space;
    receiving the retransmitted DL data without a transmission of the HARQ-ACK information and a reception of the second DCI.

2. The method of claim 1, wherein a first channel state information reference resource is different from a (CSI-RS) for the retransmitted DL data without the transmission of the HARQ-ACK information and the reception of the second DCI second CSI-RS for the retransmitted DL data with the transmission of the HARQ-ACK information and the reception of the second DCI.

3. The method of claim 1, wherein the retransmitted DL data is received after a predetermined time from time of reception of the DL data based on the first DCI.

4. The method of claim 1, wherein the retransmitted DL data is received in a first transmission time interval (TTI) which is available after time of reception of the DL data based on the first DCI.

5. The method of claim 1, wherein, based on a first transmission time interval (TTI) length used for the retransmitted DL data without the transmission of the HARQ-ACK information and the reception of the second DCI being different from a second TTI length used for the retransmitted DL data with the transmission of the HARQ-ACK information and the reception of the second DCI, an MCS for the retransmitted DL data is configured based on the second TTI length.

6. The method of claim 1, wherein a first MCS for the retransmitted DL data is determined as a value to which an offset which is predetermined from a second MCS used for the DL data.

7. The method of claim 6, wherein the first MCS is used only for the retransmitted DL data for the DL data belonging to a range of a predetermined number of times.

8. The method of claim 1, wherein a first transmission power for the retransmitted DL data is determined as a value to which an offset which is predetermined from a second transmission power used for the DL data.

9. The method of claim 8, wherein the first transmission power is used only for the retransmitted DL data for the DL data belonging to a range of a predetermined number of times.

10. The method of claim 1, wherein a first resource assignment for the retransmitted DL data is performed on a frequency resource separated from a second resource assigned for the DL data by a predetermined offset.

11. The method of claim 10, wherein the first resource assignment includes frequency hopping according to one of plural predetermined patterns.

12. The method of claim 1, wherein a redundancy version (RV) for the retransmitted DL data is cyclically shifted according to a predetermined pattern.

13. The method of claim 1, wherein the UE is a part of an autonomous driving device.

14. The method of claim 13, wherein the UE is communicating with at least one of a network or an autonomous driving vehicle.

15. A user equipment (UE) capable of receiving downlink (DL) data in a wireless communication system, the UE comprising:
    a receiver and a transmitter; and
    a processor configured to control the receiver and the transmitter, wherein the processor is further configured to:
receive first Downlink Control Information (DCI) for scheduling the DL data;
receive the DL data based on the first DCI;
based on the first DCI being received through a first search space;
transmit a hybrid automatic repeat request-acknowledgement (HARQ-ACK) information in response to the DL data;
receive second DCI for scheduling retransmission of the DL data; and
receive retransmitted DL data based on the second DCI,
based on the first DCI being received through a second search space different from the second search space;
receive the retransmitted DL data without a transmission of the HARQ-ACK information and a reception of the second DCI.

16. The UE of claim 15, wherein the UE is a part of an autonomous driving device.

17. The UE of claim 16, wherein the UE is communicating with at least one of a network or an autonomous driving vehicle.

\* \* \* \* \*